United States Patent
Vassaux et al.

(10) Patent No.: US 7,823,474 B2
(45) Date of Patent: Nov. 2, 2010

(54) GEAR WITH INTEGRAL OVERCOUPLE PROTECTION

(75) Inventors: Alain Vassaux, Puteaux (FR); Khalid Belhaj, Bois Colombe (FR)

(73) Assignee: Hispano Suiza, Colombes Cedex (FR)

( * ) Notice: Subject to any disclaimer, the term of this patent is extended or adjusted under 35 U.S.C. 154(b) by 374 days.

(21) Appl. No.: 11/965,190

(22) Filed: Dec. 27, 2007

(65) Prior Publication Data

US 2008/0156130 A1   Jul. 3, 2008

(30) Foreign Application Priority Data

Dec. 27, 2006   (FR) .................................. 06 55988

(51) Int. Cl.
*F16H 57/00* (2006.01)
(52) U.S. Cl. .......................................... 74/405; 74/411
(58) Field of Classification Search .................... 74/405, 74/406, 411, 412 R, 447; 464/32
See application file for complete search history.

(56) References Cited

U.S. PATENT DOCUMENTS

| | | | | |
|---|---|---|---|---|
| 3,247,735 A | * | 4/1966 | Bonnafe | .................... 74/325 |
| 4,347,715 A | * | 9/1982 | Carman et al. | ................. 464/32 |
| 5,261,750 A | * | 11/1993 | Eckhardt et al. | ............ 384/455 |
| 5,341,736 A | * | 8/1994 | Makosch et al. | ............. 101/212 |

FOREIGN PATENT DOCUMENTS

| | | |
|---|---|---|
| DE | 29 44 843 A1 | 5/1981 |
| DE | 42 40 142 C1 | 3/1994 |
| GB | 888116 | 1/1962 |

OTHER PUBLICATIONS

U.S. Appl. No. 11/958,951, filed Dec. 18, 2007, Vassaux.

* cited by examiner

*Primary Examiner*—Thomas R Hannon
*Assistant Examiner*—Justin Krause
(74) *Attorney, Agent, or Firm*—Oblon, Spivak, McClelland, Maier & Neustadt, L.L.P.

(57) ABSTRACT

A gear including a pinion being integral with a rotatably mounted shaft in a support by a cleavable element arranged to disengage the pinion from the shaft in case of an overcouple between the pinion and the shaft is disclosed. A guiding bearing, pending between the pinion and the shaft, is arranged to rotatably guide the pinion around the shaft, in case of a disengagement of the pinion from the shaft. In a turbomachine, a gear box including such a gear allows the driving of auxiliary machines in case of a breakdown of a shaft in the gear box.

8 Claims, 2 Drawing Sheets

GEAR WITH INTEGRAL OVERCOUPLE PROTECTION

The present invention relates to the gear field, particularly to the gears present in gearing boxes for driving auxiliary machines in a turbomachine.

The gears are used in all branches of mechanics to transmit movements, from clocks to heavy industry reductors. A gear is composed of two toothed pinions, respectively mounted on rotatable shafts. A driving shaft rotatably drives a pinion, said pinion being integrally mounted with the shaft. The teeth of the driving pinion are engaged with the driven pinion teeth in order to transmit the rotary movement from the driving shaft to the driven shaft. When more than two toothed pinions are engaged, this is referred to as a gear train.

A gear train comprises a plurality of serial gears forming a kinematics chain. A motor shaft mounted upstream from the kinematics chain rotatably drives a pinion with which it is integrally arranged. The pinions of the gear train, placed downstream from the motor shaft in the kinematics chain, are rotatably driven step by step by the rotation of the motor shaft.

The pinions respectively situated upstream and downstream in the kinematics chain with respect to a given pinion, will be referred to as upstream and downstream pinions herein below, the upstream pinion transmitting the rotary movement to the given pinion, the downstream pinion being rotatably driven by the given pinion.

A gear train can advantageously rotatably drive a plurality of shafts from a motor shaft, each driven shaft driving respectively one machine. The invention particularly relates to a gear train present in turbojets in order to drive auxiliary machines.

In a serial mounting of the gears, if a driven shaft is stuck or immobilized, the pinion integral with the shaft cannot rotate. All the pinions of the kinematics chain are likely to be blocked. In order to let the gear train go on working in such hypothesis, it is known to provide fusible means.

There are in the prior art gears formed with two pinions mounted on shafts provided with rectangular wedges fitted with the shaft. The pinions respectively comprise rectangular notches at their internal ring corresponding to the shape of the wedges. In operation, the pinions are mounted on the shafts, the notches maintaining the wedges in order to make the pinion integral with the shaft.

If one of the shafts of the gear train is stuck, the pinion the shaft of which is immobilized, suffers from an overcouple generated by the upstream pinion. The overcouple has this effect that the wedge gives way, whereby the pinion is disengaged from its shaft. The upstream pinion rotatably drives the disengaged pinion around the shaft. The kinematics chain is maintained, but for a period that can be quite short, since the pinion tends to be out of true and to move transversally and radially, this being able to go sometimes up to the gear stop, the auxiliary machines mounted downstream being then no more supplied. The loss of couple has an incidence on the gears and particularly on the machines mounted on these gears.

One object of the invention is to allow a pinion, the shaft of which is immobilized, to transmit the rotary movement to a downstream pinion in order to maintain the transmission yield per gear.

For this purpose, the Applicant provides a gear comprising the pinion being integral with a rotatably mounted shaft in a support through a cleavable element arranged to disengage the pinion from the shaft in case of an overcouple between the pinion and the shaft, characterized by the fact that a guiding bearing, being pending between the pinion and the shaft, is arranged to guide the pinion in rotation around the shaft in case of a disengagement of the pinion from the shaft.

Advantageously, if a shaft being integral with an auxiliary pinion from a gear train is stuck or immobilized, the pinion, being submitted to an important couple, is disengaged from the shaft by means of the cleavable element serving as a "fuse". The guiding bearing, so far pending, becomes active. This bearing allows to guide the disengaged pinion in its rotation around the shaft. Despite the breakdown, the yield of the gear is maintained.

Still advantageously, the bearing takes a small place and is light. Indeed, it is disposed inside the pinion and does not require guiding means located "outside" the pinion.

Preferably, the cleavable element is removably mounted between the pinion and the shaft.

More preferably, the cleavable element is formed with at least one disc hooped between the pinion and the shaft, the disc comprising a plurality of radial arms.

Still more preferably, the guiding bearing belongs to the group formed by a roller bearing, a ball bearing and a ring bearing.

Most preferably, the guiding bearing is a NUP type roller bearing.

According to another aspect of the invention, a box of auxiliary gears comprises a plurality of gears, in which at least one of the gears is a gear according to the invention.

Preferably, the gear box drives auxiliary machines in a turbomachine.

According to an other aspect of the invention, a turbomachine comprises such a gear box.

The invention will be better understood from the following description, with reference to the accompanying drawing, in which.

Figure 3:
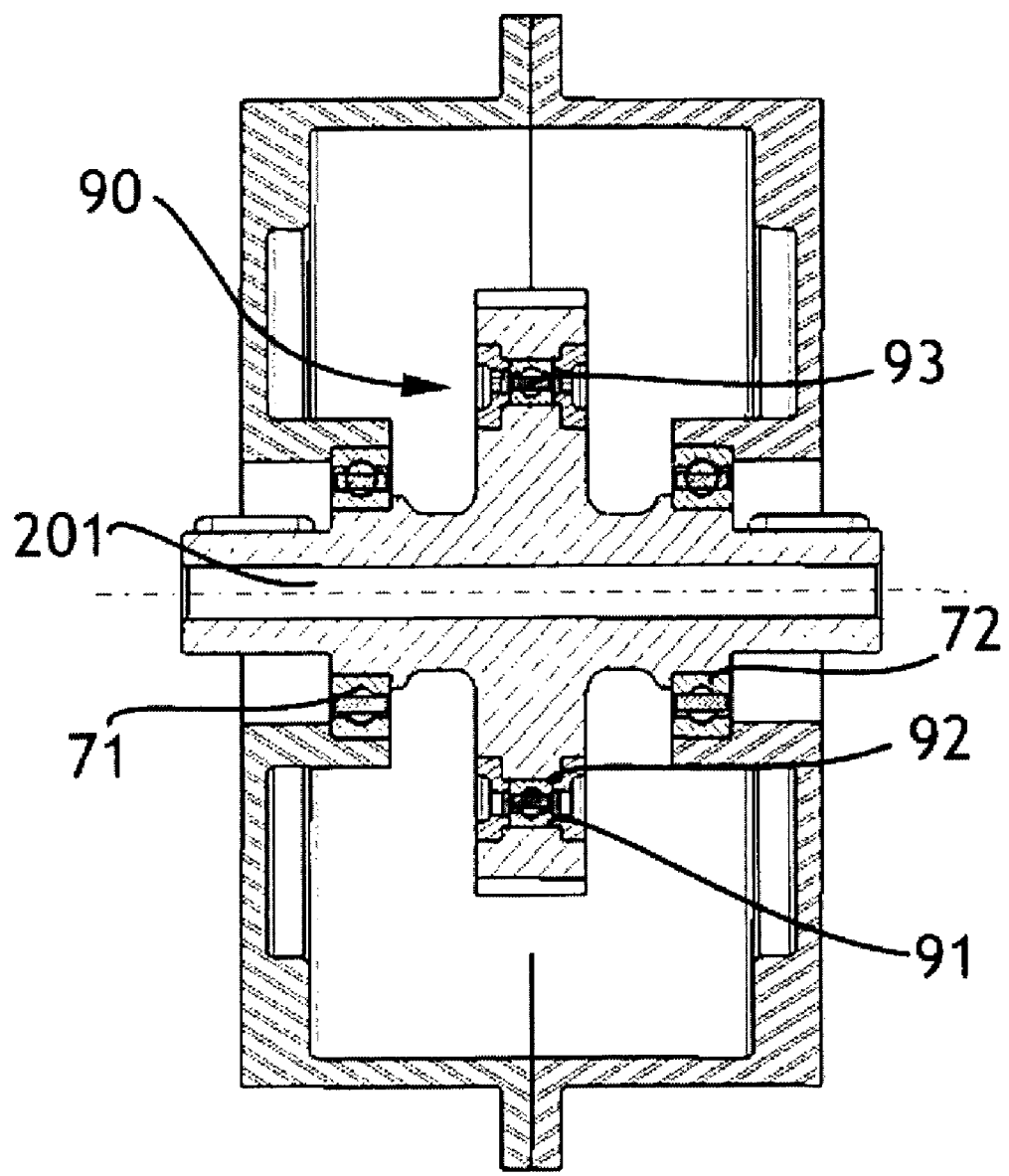
FIG. 3 shows a perspective view of another embodiment of the invention with a ball bearing.

Referring to FIG. 3, in a preferred embodiment of the invention, a turbojet, non shown, comprises a gear box 100. The gear box 100 serves to drive auxiliary machines mounted on shafts of a gear train supported in the box 100. Such a box 100 is generally referred to as the letter symbol AGB for "Accessory Gear Box".

Figure 1:
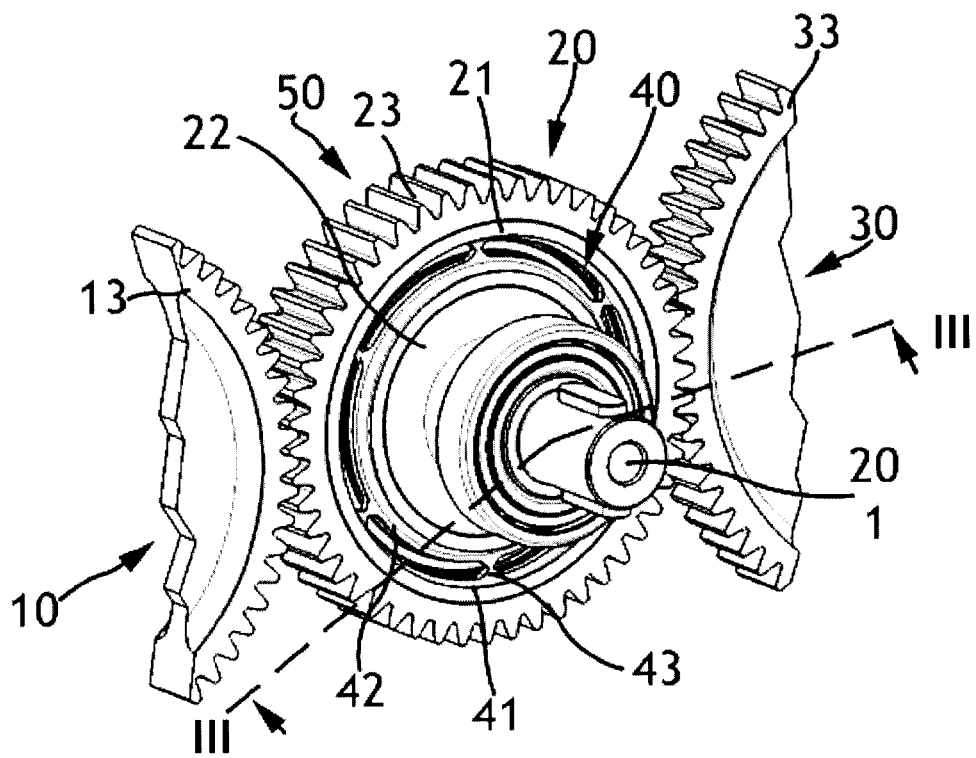
FIG. 1 shows a perspective view of the gear of the invention.

Referring to FIG. 1, the gear train comprises herein three pinions 10, 20, 30 provided respectively with teeth 13, 23, 33. The pinions 10, 20, 30 are arranged in series forming a kinematics chain. A motor shaft rotatably drives the pinion 10. The rotary movement is transmitted to the pinion 20 by the teeth 13 engaged with the teeth 23, the pinions 10, 20 forming a first gear, the pinions 20, 30 forming a second gear.

The pinion 20 is integrally mounted on a rotatable shaft 201. So, when the pinion 20 is rotatably driven by the upstream pinion 10, it drives the shaft 201 by itself.

Figure 2:
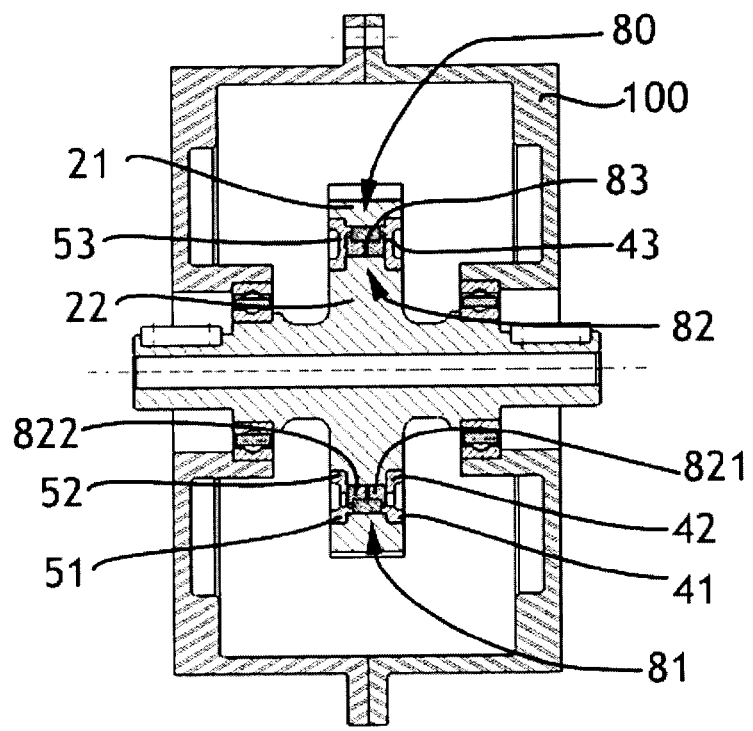
FIG. 2 shows a sectional view along line III-III of the gear of FIG. 1 with a roller bearing.

Referring to FIG. 2, the shaft 201 is supported by bearings 71, 72, disposed respectively on each side of the pinion 20, to guide the rotation of the shaft 201 in the box 100. The bearings 71, 72 are shown here as roller bearings.

The shaft 201 comprises a radially protruding part, forming a trunk 22, about which is mounted a cylindrical ring 21, provided with teeth 23 on its outer surface. A roller bearing 80 extends, circumferentially, between the trunk 22 and the ring 21, allowing the ring 21 to be rotatably driven around the trunk 22.

The bearing 80 comprises an inner ring 82 supporting the rollers 83, being disposed longitudinally.

The rollers 83 are radially supported outside by the inner bore of the ring 21, forming a track 81. A roller bearing 80 provides, thanks to the linear contact between the track 81, the cylindrical rollers 83 and the ring 82, a high capacity of radial loading of the bearing and hence is adapted to high rotation speeds.

The ring 82 comprises two parts, each one comprising a circumferential shoulder 821, 822 allowing for the axial setting of the rollers 83. This type of roller bearings 80, with two axial abutments, is referred to as NUP.

The bearing 80 is mounted, pending inside the pinion 20, that is it is not active. The connexion, between the trunk 22 and the cylinder 21, is made by two linking discs 40, 50 disposed on each side of the pinion 20, transversely to the shaft 201, between the trunk 22 and the ring 21. The discs 40, 50 make the trunk 22 integral with the pinion 20, the discs being advantageously mounted by hooping. The discs 40, 50, forming the wings of the pinion 20, maintain the ring 82 of the bearing 80 with the rollers 83 integral with the pinion 20. The bearing 80 cannot be moved axially inside the pinion 20.

Referring to FIG. 1, the disc 40 comprises two concentric rings 41, 42, the outer ring 41 being connected to the inner ring 42 by radial arms 43. The outer surface of the ring 41 of the disc 40 abuts against the inner surface of the ring bore 21 in the pinion 20, the inner surface of the ring 42 abutting against the trunk 22.

The arms 43 of the disc 40 are formed in such a way that they have a "cleavable" portion arranged to give in for a couple value, between the trunk 22 and the ring 21, superior to a determined threshold value. The disc 50 is formed similarly to the disc 40 and is arranged on the pinion 20, on the side opposite to the disc 40.

Upon a normal operation of the gear train, the upstream pinion 10 rotatably drives the pinion 20, the couple received being lower than the threshold value. The rotary movement is transmitted to the downstream pinion 30 by the pinion 20. The ring 21 rotatably drives the trunk 22 by means of the discs 40, 50. The roller bearing 80 is pending.

If the shaft 201 is stuck, the rotary movement is perturbated. An overcouple, exceeding the threshold value, is created between the pinion 20 and the trunk 22 and makes the arms 43, 53 give in. The "fusible" part of each arm 43, 53 gives in and releases the pinion 20 rotating about the trunk 22.

Once the arms have given in, the roller bearing 80 is then active. The rollers 83 rotate between the rings 81, 82, allowing the rotation of the ring 21 around the trunk 22. The shoulders 821, 822 axially maintain the rollers 83 and avoid the ring 21 to be driven into translation around the trunk 22.

The roller bearing 80 allows to stress the axial and transversal movements of the pinion 20 and only permits the rotation of the pinion 20 around the trunk 22. Hence, the pinion 20, being disengaged, does not contact the box 100. Despite the breakdown of the shaft 201, the yield of the gear is optimized and the kinematics chain is preserved.

In another embodiment, referring to FIG. 3, a ball guiding bearing 90 extends, circumferentially, between the trunk 22 and the ring 21, allowing the ring 21 to be rotatably driven around the trunk 22.

A ball bearing 90 comprises an inner circumferential cage 92 and an outer circumferential cage 91 between which the balls 93 are disposed. The bearing 90 is arranged pending. The connexion, between the trunk 22 and the cylinder 21, is realised, similarly to the preceding embodiment, by hooping of two linking discs 40, 50 between the trunk 22 and the ring 21.

In another embodiment, not shown, a ring bearing extends, circumferentially, between the trunk 22 and the ring 21, allowing the ring 21 to be rotatably driven around the trunk 22. The ring bearing comprises two concentric rings made in a material of low friction coefficient, such as bronze or polytetrafluoroethylene (PTFE), the rings coming in surface contact to guide the ring 21 around the trunk 22.

The discs 40, 50, hooped between the ring 21 and the trunk 22, are easily removable after break. Their exchange is fast, simple and cheap. When a shaft 201 is stuck, the energy provided by the overcouple is absorbed by the discs 40, 50 and it is not necessary to replace the expensive parts such as the shaft 201 and the rings 21.

At the turbomachine level, the invention allows for the gear box to drive the auxiliary machines despite the breakdown of a shaft of the gear train.

The invention claimed is:

1. A gear comprising:
   a pinion including a cylindrical ring with an outer surface and an inner surface;
   a shaft which is rotatably mounted in a support;
   a disc which is mounted between the pinion and the shaft such that the pinion and the shaft are integral, the disc including an outer ring, an inner ring and a plurality of cleavable radial arms which connects the outer ring and the inner ring; and
   a guiding bearing disposed between the pinion and the shaft,
   wherein an outer surface of the outer ring of the disc abuts the inner surface of the cylindrical ring of the pinion and an inner surface of the inner ring of the disc abuts the shaft,
   wherein the cleavable radial arms are arranged to disengage the pinion from the shaft in case of an overcouple between the pinion and the shaft,
   wherein the guiding bearing is arranged to rotatably guide the pinion around the shaft in case of a disengagement of the pinion from the shaft.

2. The gear according to claim 1, wherein said disc is removably mounted between the pinion and the shaft.

3. The gear according to claim 1, wherein the guiding bearing is a roller bearing, a ball bearing or a ring bearing.

4. The gear according to claim 1, wherein the guiding bearing is an NUP roller bearing.

5. A gear box comprising a plurality of gears, with at least one gear according to claim 1.

6. The gear box according to claim 5, wherein the gear box drives auxiliary machines in a turbomachine.

7. A turbomachine comprising a gear box of auxiliary machines according to claim 6.

8. The gear according to claim 1, wherein the shaft includes a radially protruding part and a shoulder, the radially protruding part abuts an inner ring of the guiding bearing and the shoulder abuts the inner surface of the inner ring of the disc.

\* \* \* \* \*